June 7, 1966    J. H. ROGERS ETAL    3,254,905
ANTI-SWAY SHORT-TURN TYPE HITCH
Filed Sept. 26, 1963    2 Sheets-Sheet 1

INVENTORS
JOHN HARLAN ROGERS
JOHN W. SAXTON
BY Dick & Darley
ATTORNEYS

INVENTORS
JOHN HARLAN ROGERS
JOHN W. SAXTON
BY
Dick and Harley
ATTORNEYS

United States Patent Office 3,254,905
Patented June 7, 1966

3,254,905
ANTI-SWAY SHORT-TURN TYPE HITCH
John Harlan Rogers and John W. Saxton, Fort Dodge, Iowa, assignors to The Standard Engineering Company, Fort Dodge, Iowa
Filed Sept. 26, 1963, Ser. No. 311,764
3 Claims. (Cl. 280—458)

This invention relates to hitches and more particularly to mechanical hitches for operatively connecting a loading vehicle to a trailing vehicle.

The use of hitches for connecting vehicles and especially hitches for connecting prime movers such as tractors to implements is old. Usually such hitches consist of a draw bar attached to the tractor and a draw bar pin for detachably connecting the draw bar to the farm implement. Such common hitch means are objectionable in that they do not stabilize lateral swaying movement of the vehicle being pulled. Also they do not encourage the desired short turning radius of the vehicles. Furthermore they lack adjustments to meet various adverse conditions. A still further objection is that they often break or damage the power take-off means between the prime mover and the implement.

Therefore one of the principal objects of our invention is to provide a successful hitch means for detachably connecting a loading vehicle to a trailing vehicle.

A further object of this invention is to provide a hitch means for connecting wheeled vehicles that permits the turning of the vehicles in a minimum radius.

A still further object of this invention is to provide a hitch means for connecting a leading vehicle to a trailing vehicle that prevents undesirable lateral movement of the trailing vehicle.

A still further object of this invention is to provide a hitch means between a prime mover and an implement that permits turning without damaging the power take-off means between the prime mover and the implement.

A still further object of this invention is to provide a hitch having adjustments for substantially all conditions.

Still further objects of our invention are to provide a hitch that is economical in manufacture and durable in use.

These and other objects will be apparent to those skilled in the art.

This invention consists in the construction, arrangements, and combination, of the various parts of the device, whereby the objects contemplated are attained as hereinafter more fully set forth, specifically pointed out in the claims, and illustrated in the accompanying drawings, in which:

Figure 1:
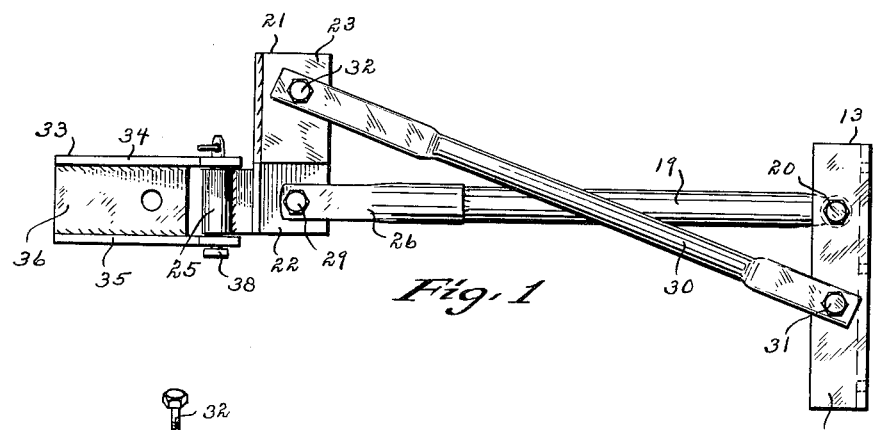
FIG. 1 is a top plan view of our hitch.
Figure 2:
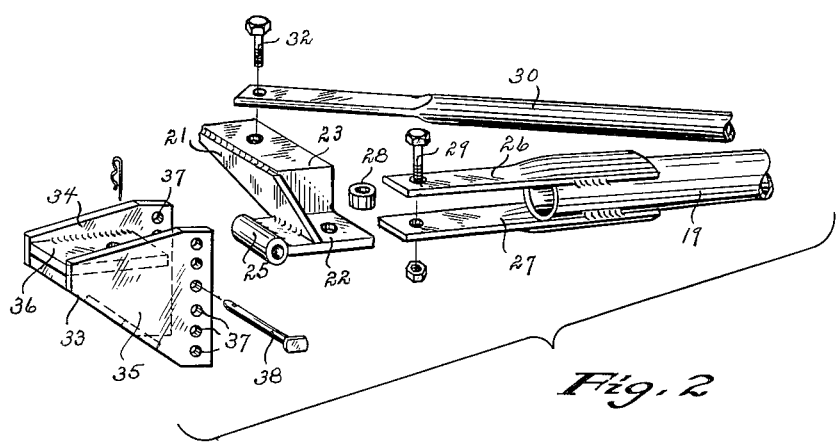
FIG. 2 is a perspective exploded view of the forward parts of our hitch.
Figure 3:
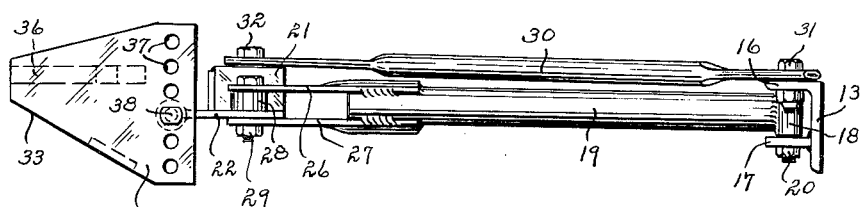
FIG. 3 is a side view of the hitch.
Figure 4:
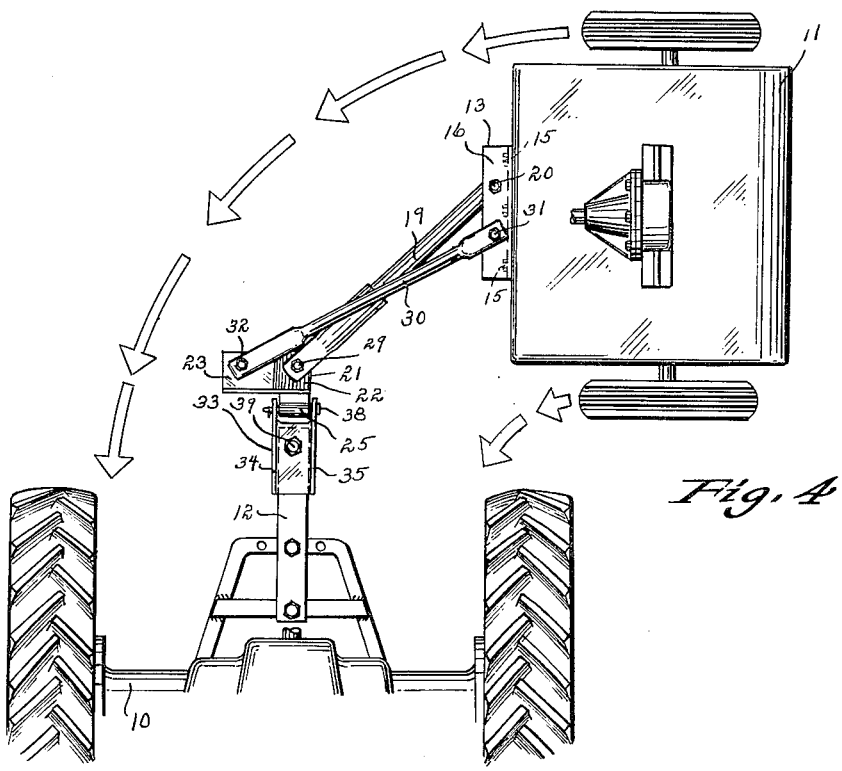
FIG. 4 is a top plan view of the hitch, installed, in use, and illustrating the positions of its parts during a turning operation.
Figure 5:
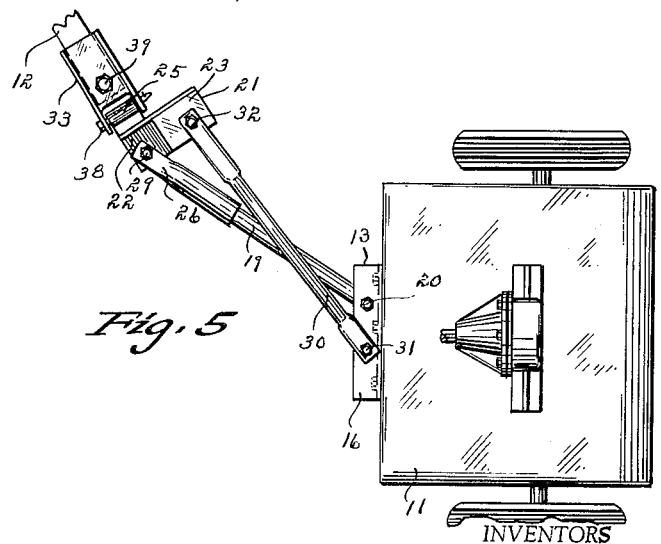
FIG. 5 is a top plan view of the installed hitch showing the positions of its parts when the vehicles are turning in a direction different from that shown in FIG. 4.

In these drawings I have used the numeral 10 to designate the leading vehicle such as a tractor, and the numeral 11 to designate a trailing vehicle such as a farm implement. The leading vehicle has the usual draw bar 12. In the use of our hitch, it is recommended that the draw bar 12 be locked against horizontal swinging movement as shown in FIG. 4. The numeral 13 generally designates the rear base member of the hitch adapted to be detachably secured to the trailing vehicle by bolts or like 15. This base member has two spaced apart horizontal forwardly extending lip flange members 16 and 17. Between the flange members 16 and 17 is a bearing member 18 having a forwardly extending pipe arm 19. The numeral 20 designates a pin bolt detachably extending through the flange 16, the bearing member 18 and the flange 17 for horizontally hingedly connecting the rear end of the arm 19 to the base 13. The numeral 21 generally designates the forward base member of the hitch having a lower horizontal platform portion 22, and an upper horizontal platform portion 23, and a transversely arranged horizontal bearing 25. On the forward end area of the pipe arm 19 are two forwardly extending bars 26 and 27. The bar 26 extends below the platform portion 22 and the bar 27 extends above the platform portion 22. The arm 19 has its forward end detachably operatively horizontally hingedly secured to the forward base 21 by a bolt pin 29 extending through the bar 26, a washer means 28, the platform portion 22, and the bar 27, as shown in FIG. 3. The numeral 30 designates a second pipe arm having its two ends flattened. The rear end of the arm 30 is detachably horizontally hinged to the rear base 13, at a point to the left of the rear hinged point of the arm 19, by a bolt means 31 extending through the rear end area of the arm 30, and the lip flange 16 of the rear base member. The length of the arm 30 crosses over and above the length of the arm 19 as shown in FIG. 1. The forward end of the arm 30 is detachably horizontally hinged to the forward base member 21, at a point to the right of the forward hinged point of the arm 19, by a bolt means 32 extending through the forward end area of the arm 30, and the upper platform 23. The numeral 33 designates the triangle block member having the two sides 34 and 35 and the horizontal shelf 36 between the two sides 34 and 35. Through the rear portion of each of the sides 34 and 35 is a vertical row 37 of holes. This triangle block member is detachably secured to the forward base portion 21 by selectively detachably running the pin 38 through the registering holes 37 and the bearing 25. To rigidly detachably secure the triangle block member 33 to the draw bar 12 of the leading vehicle, the rear end portion of the draw bar is placed on the shelf ledge 36, between the sides 34 and 35, and a bolt means 39 extended through the draw bar 12 and shelf ledge 36. By selecting the elevation setting of the pin 38 the forward end of our hitch proper will be adjustably vertically positioned. Inasmuch as the pin 38 extends through the horizontal bearing 25, the forward end of the hitch proper will be vertically hingedly connected. When the vehicles are traveling forwardly, the arm 19 will extend forwardly between the base 13 and base 21, with the link arm 30 crossing over it and extending forwardly and to the right at an angle to the longitudinal axis of the vehicles and as shown in FIG. 1. By the two arms 19 and 30 crossing, not only are there two double hitching means, but because of the crossing one arm will work against the other arm to prevent any undesirable lateral swaying of the vehicle being pulled. Furthermore, if the pulling vehicle were to turn to the right as shown in FIG. 5, the arm 30 will hold back or retard the swinging movement of the left side of the trailing vehicle 11. This means a turn of the vehicles in a minimum radius, but by making the trailing vehicle substantially follow in the tracks of the rear wheels of the leading vehicle, any power take-off means (not shown) between the leading and trailing vehicles, will not be broken nor damaged during the turning operation. When the turn is to the left, as shown in FIG. 4, the arm 19 will hold back the right side of the implement 11.

From the foregoing it will be appreciated that the horizontal pivot points are at four localities, i.e., at the bolts 20, 29, 31 and 32, and that the vertical pivot point is at the pin 38.

Some changes may be made in the construction and arrangement of our hitch without departing from the real spirit and purpose of our invention, and it is our intention to cover by our claims, any modified forms of structure or use of mechanical equivalents which may be reasonably included within their scope.

We claim:
1. In a hitch for connecting a leading vehicle to a trailing vehicle,
   a rear base member adapted to be secured to a trailing vehicle,
   a forward base member adapted to be operatively secured to a leading vehicle,
   said forward base member having a lower horizontal platform and an upper horizontal platform,
   a first arm having one end horizontally hinged to said rear base member and
      its other end horizontally hinged to the lower horizontal platform on said forward base member,
   and a second arm having its length crossing the length of said first arm,
      said second arm having one end horizontally hinged to the rear base member and its other end horizontally hinged to the upper horizontal platform on said forward base member;
   said second arm being in a horizontal plane above the horizontal plane of said first arm,
   said first and second arm each being straight and disposed in parallel relationship to each other.
2. The structure of claim 1 and a horizontal transverse bearing on said forward base member and a block member adapted to be connected to a tractor, pin means in said bearing and engaging said block member to pivotally connect said block member to said forward member.
3. In a hitch for connecting a leading vehicle to a trailing vehicle, a rear base member adapted to be secured to a trailing vehicle,
   a forward base member adapted to be operatively secured to a leading vehicle,
   a first arm having one end horizontally hinged to said rear base member and
      its other end horizontally hinged to said forward base member,
   a second arm having its length crossing the length of said first arm,
      said second arm having one end horizontally hinged to the rear base member and its other end horizontally hinged to said forward base member,
   a horizontal transverse bearing on said forward base member,
   a block member having two spaced apart vertical side walls and a ledge shelf between the two side walls;
   said two side walls and said ledge shelf adapted to receive the draw bar of a leading vehicle;
   said two side walls extending past each end of said transverse bearing respectively, and each side wall having a vertical row of holes,
   and a detachable means extending through said transverse bearing and selectively through a hole in each of said side walls.

References Cited by the Examiner
UNITED STATES PATENTS

| 2,201,660 | 5/1940 | Christensen | 280—459 |
| 2,603,502 | 7/1952 | Hilblom | 280—458 |
| 2,847,232 | 8/1958 | Graham | 280—490 |
| 3,014,545 | 12/1961 | Shepley | 180—14 |

FOREIGN PATENTS

| 562,548 | 9/1958 | Canada. |

LEO FRIAGLIA, *Primary Examiner.*

BENJAMIN HERSH, *Examiner.*

R. C. PODWIL, *Assistant Examiner.*